United States Patent [19]

Golben et al.

[11] 4,396,114
[45] Aug. 2, 1983

[54] FLEXIBLE MEANS FOR STORING AND RECOVERING HYDROGEN

[75] Inventors: Peter M. Golben, Wyckoff; Warren F. Storms, Mahwah, both of N.J.

[73] Assignee: MPD Technology Corporation, Wyckoff, N.J.

[21] Appl. No.: 304,249

[22] Filed: Sep. 21, 1981

[51] Int. Cl.³ .......................... F17D 1/02; F17D 1/04; F17C 11/00
[52] U.S. Cl. ........................................ 206/0.7; 34/15; 62/48
[58] Field of Search ................. 206/0.7; 62/48; 34/15; 260/648 R

[56] References Cited
U.S. PATENT DOCUMENTS

| | | | |
|---|---|---|---|
| 3,375,676 | 4/1968 | Reilly, Jr. et al. | 62/48 |
| 3,516,263 | 6/1970 | Wiswall, Sr. et al. | 62/48 |
| 4,135,621 | 1/1979 | Turillon et al. | 206/0.7 |
| 4,165,569 | 8/1979 | Mackay | 34/15 |
| 4,183,369 | 1/1980 | Thomas | 206/0.7 |
| 4,225,320 | 9/1980 | Gell | 206/0.7 |
| 4,282,931 | 8/1981 | Golben | 169/61 |

Primary Examiner—William T. Dixson, Jr.
Attorney, Agent, or Firm—Raymond J. Kenny; Edward A. Steen

[57] ABSTRACT

Means (10) for storing and recovering hydrogen. A tube (12), circumscribing a flexible spring (14), is packed with hydridable material (16). Recovery for storage of the hydrogen may be effectuated by hydriding or dehydriding the hydridable material (16). Depending on the circumstances, (i.e. hydriding or dehydriding) hydrogen will be driven across the boundry between the spring (14) and the hydridable material (16).

9 Claims, 2 Drawing Figures

FLEXIBLE MEANS FOR STORING AND RECOVERING HYDROGEN

TECHNICAL FIELD

This invention relates to the utilization of hydrogen in general and more particularly to an apparatus for storing and recovering hydrogen from a hydridable material.

BACKGROUND OF THE ART

Abundantly available, hydrogen has long been employed in many chemical processes. Now, as industry develops new applications for hydrogen, there is a growing need to store hydrogen safely and conveniently.

Hydrogen is stored conventionally as a gas in steel cylinders at high pressures (e.g., 13.79 MPa or 2,000 psi) and at lower pressures as a liquid in insulated containers. Both methods of storage require comparatively bulky storage containers. In addition to their unwieldy size, such containers are inconvenient due to the high pressure required for gas storage in cylinders and the ever present danger of gaseous hydrogen evolving from boiling-off of the liquid form.

Within recent years, considerable attention has been focused on the storaage of hydrogen as a metallic compound, or hydride, of various substances. Metal hydrides, in the form of powders, can store large amounts of hydrogen at low and even sub-atmospheric pressures in relatively small volumes. This low pressure storage of hydrogen is relatively safe and allows the construction of hydrogen containers having forms significantly different than those presently known.

Apart from the storage of hydrogen, hydrides are also currently being evaluated for gas compression, solar heat storage, heating and refrigeration, hydrogen purification, utility peak-load shaving, deuterium separation, electrodes for electrochemical energy storage, pilotless ignitors and internal combustion engines.

Hydridable metals are charged with hydrogen by introducing pressurized gaseous hydrogen into valved containers. The hydrogen gas reacts exothermically with the metal to form a compound. Discharging of the metal hydride is accomplished by opening the valve of the container, to permit decomposition of the metal hydride, an endothermic reaction. It has been found expedient when gas is desired from the storage vessel to heat the storage vessel thereby increasing the flow of hydrogen or providing hydrogen at pressures substantially above atmospheric.

During the adsorption/desorption process, the hydridable metal has been found to expand and contract as much as 25% in volume as a result of hydrogen introduction and release from the metal lattice. Such dimensional change leads to fracture of the metal powder particles into finer particles. After several such cycles, the fine powder self-compacts causing inefficient heat transfer and, as a consequence, hydrogen transfer. Additionally, and of even greater significance, high stresses due to the compaction of the powder and expansion during hydride formation are directed against the walls of the storage container. The stress within the powder has been observed to accumulate until the yield strength of the container is exceeded whereupon the container plastically deforms, buckles or bulges and eventually ruptures. Such rupture is extremely dangerous since a fine, often pyrophoric powder is violently expelled by a pressurized, flammable hydrogen gas. Small, experimental cylinders of the aforedescribed type have indeed been found to burst when subjected to repetitive charging-discharging conditions.

In particular, the successful application of metal hydride technology for the recovery of usable energy from low grade heat sources such as industrial waste heat and solar energy has been previously hindered by the following problems:

1. Heat transfer through a metal hydride powdered bed is inherently poor.
2. The aforementioned tendencies of the hydrides (due to hydride expansion when absorbing hydrogen) have been known to produce substantial mechanical forces and therefore have hindered the use of economical hydride containment designs.
3. Hydrogen pressure drops through the hydride beds may become so excessive that gas transfer is seriously impaired.

One current solution to the problems enumerated above is the employment of cylindrical capsules to contain the hydride. See U.S. Pat. No. 4,135,621. When oriented in a horizontal position, this technology has been successful in alleviating the deleterious compaction problem. However, poor heat transfer and excessive pressure drops have warranted continued investigation.

SUMMARY OF THE INVENTION

Accordingly, there is provided a hydrogen storage recovery-heat exchanger tube. A prestressed hollow spring, running substantially the entire length of the tube, is axially disposed within the tube. A bed of hydridable material is packed into the tube filling the void between the spring and the inner wall of the tube. One end of the tube may be sealed.

The spring acts as a conduit for the hydrogen; the direction of the hydrogen flow being a function of whether the container is being hydrided or dehydrided. Simultaneously, the spring, acting as a flexible spine for the tube, immobilizes the hydride powder and prevents it from shifting about.

BEST MODE FOR CARRYING OUT THE INVENTION

Figure 1:
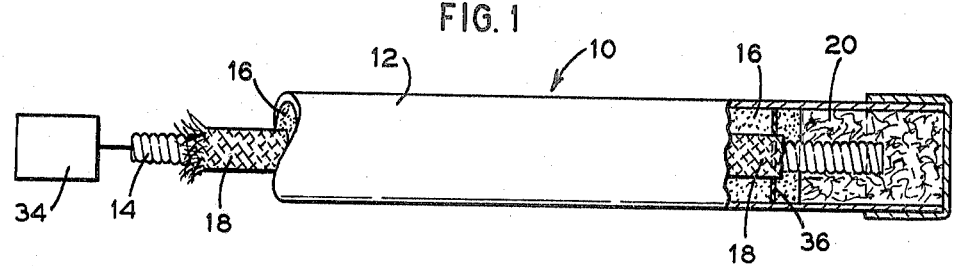
FIG. 1 is a cross section of the invention.

Referring to FIG. 1, there is shown a partially cut away, cross sectional view of the hydrogen storage-recovery-heat exchanger unit 10.

The unit 10 includes a tube 12 circumscribing a hollow spring 14. It is preferred to utilize a prestressed garter spring 14. The spring 14 axially extends substantially throughout the tube 12. Any suitable hydridable material 16 (for example, the HY-STOR [a trademark of the assignee of this invention] series of metal hydrides marketed by the assignee of this invention) is packed between the spring 14 and the internal wall of the tube 12. Care should be taken to prevent the hydride 16 from entering the hollow spring 14.

The spring 14 provides a distinct hydrogen transport conduit within the unit 10 so that upon hydriding or dehydriding the unit 10, the hydrogen will easily pass through the wire skeleton of the spring 14 to or from the hydride 16. Yet, due to the mechanical prestress of the spring 14, the hydride is immobilized and prevented from flowing about. Moreover, inasmuch as the spring 14 can be bent into any configuration, hydrogen cross over flow will be facilitated since the wire of the bent spring will tend to separate from itself.

If desired, a porous filter sheath 18 may be fitted over the spring 14 to minimize filter pore size and hydride powder leakage. By the same token, a plug 20, preferably made from glass wool, may be disposed at the closed end of the spring 14 to prevent the hydride material from entering the hollow of the spring 14.

A plurality of spacers 36 (only one is shown) may be employed to support and center the spring 14 within the tube 14.

The invention and the manner of applying it may, perhaps be better understood by a brief discussion of the principles underlying the invention.

As was alluded to earlier, hydrogen must be safely and conveniently stored. Moreover, in order to take full advantage of the properties of any hydridable material, the heat transfer characteristics of the material must not be impaired.

The instant invention, by effectively utilizing the large surface area interface between the spring and the hydride, easily accomplishes the above tasks. Firstly, as a result of the physical configuration of the unit 10, the hydrogen is permitted to react with substantially all of the available hydride almost instanteously and thus eliminate the hydrogen "shockwave" that has previously hindered hydrogen flow through a hydride bed. This shockwave has been known to cause container deformation and failure. Indeed, after multiple hydridings and dehydridings (50+) at different rates, there is no evidence of tube distortion or reduced kinetics.

Secondly, since the surface area of the spring-hydride interface has been greatly increased, the hydrogen flow rate between the interstices of the spring 14 remains small, thus minimizing the pressure drop between a hydrogen utilizer (i.e. a storage tank, an internal combustion engine, a temperature sensor, etc.) 34 and the hydride. This desirably low pressure drop capacity effectively increases the heat transfer rate of the hydride container and may enable the utilization of low (more stable, i.e., higher heat of formation) hydrides to be used thereby resulting in the increase of the system's thermal efficiencies.

Furthermore, inasmuch as pressure drops are minimized, relatively long lengths of thin walled tubing may be utilized. In this fashion, the number of potentially troublesome joints may be reduced per given length of tubing.

Due to the relatively large surface area of the tube 12 and the small surface area of the spring 14, the heat transfer characteristic of the unit 10 are greatly enhanced. Moreover, the ratio of unit 10 hardware to hydride may be made sufficiently small so as to not sacrifice high heat transfer rates. For example, a 0.95 cm (⅜ inch) OD tube will display a void space (that is, the distance between the tube 12 and spring 14) of only 0.127 cm (0.05 inches). It is clearly apparent that in this instance heat need only travel a small distance to achieve the desired effect upon the hydride. Indeed, a thin copper tube 12 having a 0.95 cm (⅜ inch) outside diameter exhibits a heat transfer capacity that appears to be about seven times better than a 1.27 cm (½ inch) aluminum capsule as taught by U.S. Pat. No. 4,135,621.

By boosting the heat transfer characteristics of the unit 10, low grade heat sources may be expeditiously utilized in heat pumping, heating and refrigeration, and hydrogen compression.

Moreover, in contrast to current configurations, any container configuration is possible since the former compaction problem has been eliminated.

Figure 2:
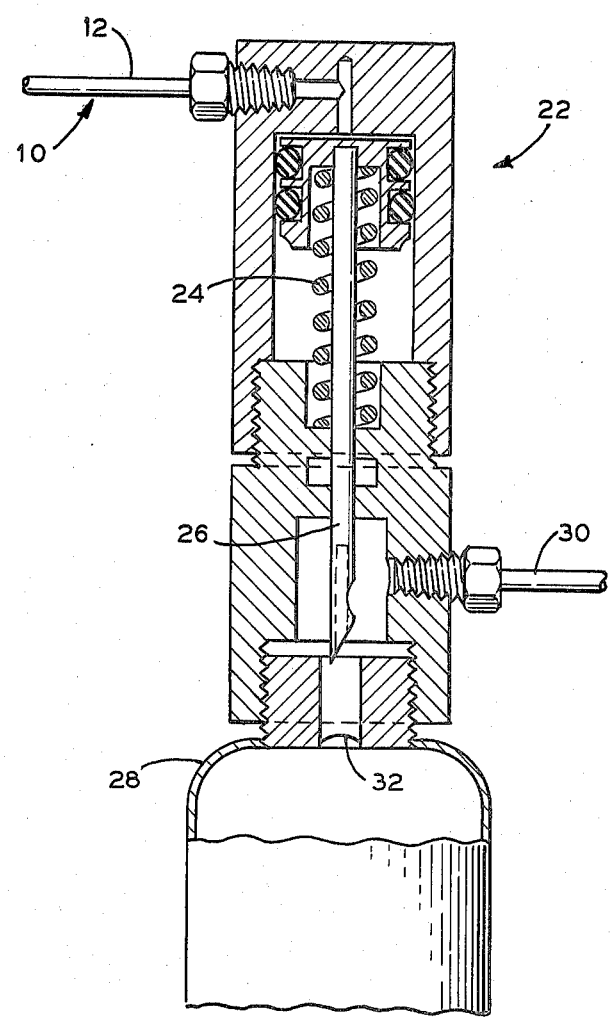
FIG. 2 is an embodiment of the invention.

FIG. 2 demonstrates the usefulness of the unit 10. In the example shown, the unit 10 is being employed as a heat sensor and actuator. The tube 12, fully-charged with hydrated powder, is connected to the pressure side of an activating piston chamber 22. Upon a suitable change in temperature, the powder dehydrides and releases hydrogen into the spring. Ultimately, the pressure of the hydrogen overcomes the force of the spring 24 to force pin 26 to pierce membrane 32, thus freeing the contents of the cartridge 28 for use via exit port 30. See U.S. Pat. No. 4,282,931.

While in accordance with the provisions of the statue, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An apparatus for storing and recovering hydrogen, the apparatus comprising a tube, a spring disposed within the tube, the exterior of the spring and the interior of the tube defining a void therebetween, and hydridable material disposed within the void and registered against the exterior of the spring and the interior of the tube.

2. The apparatus according to claim 1 wherein the spring includes a hollow central portion to expedite hydrogen flow into and out of the apparatus.

3. The apparatus according to claim 1 wherein the spring is a garter spring.

4. The apparatus according to claim 1 wherein one end of the apparatus is sealed.

5. The apparatus according to claim 1 wherein a jacket porous to hydrogen envelopes the spring.

6. The apparatus according to claim 1 wherein the apparatus is connected to means for utilizing hydrogen.

7. The apparatus according to claim 1 wherein the tube is constructed from a heat conducting material.

8. The apparatus according to claim 1 wherein the spring is flexible.

9. The apparatus according to claim 1 wherein at least one spacer is disposed between the tube and the spring.

* * * * *